United States Patent
Hensley et al.

(10) Patent No.: US 12,184,743 B2
(45) Date of Patent: *Dec. 31, 2024

(54) RESOURCE DE-DUPLICATOR FOR DATA-PROVIDER AGNOSTIC CLOUD SECURITY TOOL

(71) Applicant: Secberus, Inc., Miami, FL (US)

(72) Inventors: Jason Scott Hensley, Miami, FL (US); Oldrin Bataku, Miami, FL (US)

(73) Assignee: Secberus, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,415

(22) Filed: Dec. 15, 2023

(65) Prior Publication Data

US 2024/0195883 A1 Jun. 13, 2024

Related U.S. Application Data

(63) Continuation of application No. 17/219,601, filed on Mar. 31, 2021, now Pat. No. 11,888,954.
(Continued)

(51) Int. Cl.
*G06F 16/00* (2019.01)
*H04L 67/561* (2022.01)
(Continued)

(52) U.S. Cl.
CPC ........ *H04L 67/561* (2022.05); *H04L 67/5682* (2022.05); *H04L 63/205* (2013.01)

(58) Field of Classification Search
None
See application file for complete search history.

(56) References Cited

U.S. PATENT DOCUMENTS

| 8,122,507 B1 | 2/2012 | Andruss et al. |
| 10,567,402 B1 | 2/2020 | Comeaux et al. |

(Continued)

FOREIGN PATENT DOCUMENTS

CN 107005597 A 8/2017

OTHER PUBLICATIONS

PCT International Search Report and Written Opinion, PCT Application No. PCT/US21/25458, Sep. 27, 2021, 17 pages.
(Continued)

*Primary Examiner* — Tuankhanh D Phan
(74) *Attorney, Agent, or Firm* — Fenwick & West LLP (57) ABSTRACT

A device determines that a policy is to be executed. The device retrieves rules, resource identifiers, and data provider identifiers associated with the policy, generates a pending rules data structure and populates the pending rules data structure with identifiers of the retrieved rules and their respective necessary resources as indicated by the resource identifiers. The device generates a pending resources data structure with the resource identifiers and their respective data providers, collects, asynchronously, each resource, and, as each respective resource is collected, deletes the respective resource from the pending resources data structure and populates a collected resources data structure with an identifier of the respective resource. The device determines whether the collected resources data structure includes identifiers of all resources needed to execute a rule, and executes individual ones of the retrieved rules as it is determined that their corresponding resources have identifiers populated in the collected resources data structure.

20 Claims, 6 Drawing Sheets

Related U.S. Application Data

(60) Provisional application No. 63/006,227, filed on Apr. 7, 2020.

(51) Int. Cl.
    *H04L 67/5682*    (2022.01)
    *H04L 9/40*         (2022.01)

(56) References Cited

U.S. PATENT DOCUMENTS

| | | |
|---|---|---|
| 10,706,155 B1 | 7/2020 | Veselov et al. |
| 2006/0282660 A1 | 12/2006 | Varghese et al. |
| 2009/0022281 A1 | 1/2009 | Aboujaoude et al. |
| 2010/0146132 A1* | 6/2010 | Morris .................... H04L 67/52 709/229 |
| 2012/0102543 A1 | 4/2012 | Kohli et al. |
| 2013/0198459 A1 | 8/2013 | Joshi et al. |
| 2014/0279992 A1 | 9/2014 | Morozov |
| 2019/0372938 A1 | 12/2019 | Pasdar |
| 2020/0356676 A1 | 11/2020 | Gorlamandala |

OTHER PUBLICATIONS

PCT Invitation to Pay, PCT Application No. PCT/US21/25458, Jun. 7, 2021, two pages.
United States Office Action, U.S. Appl. No. 17/219,599, filed Jul. 26, 2022, 14 pages.
United States Office Action, U.S. Appl. No. 17/219,601, filed May 25, 2023, 16 pages.

\* cited by examiner

502
Determine that a policy is to be executed

504
Retrieve rules, resource identifiers, and data provider identifiers associated with the policy

506
Asynchronously retrieve resources from data providers that are called for by the rules

508
Execute each of the rules as their corresponding resources are retrieved

510
Identify a group of rules that have failed

512
Calculate a risk score for each rule of the group

514
Generate an alert for each rule of the group

516
Output a report including each alert, each of the alerts being prioritized in the report based on the risk score of their corresponding rule

RESOURCE DE-DUPLICATOR FOR DATA-PROVIDER AGNOSTIC CLOUD SECURITY TOOL

CROSS REFERENCE TO RELATED APPLICATIONS

This application is a continuation of U.S. application Ser. No. 17/219,601, filed Mar. 31, 2021, which claims the benefit of U.S. Provisional Application No. 63/006,227, filed Apr. 7, 2020, the disclosure of which are hereby incorporated by reference herein in their entirety.

TECHNICAL FIELD

The disclosure generally relates to the field of cloud security, and more specifically to analyzing risk, e.g., security, in cloud computing service environments.

BACKGROUND

Enterprises have been increasingly migrating infrastructures and services into the cloud in order to improve efficiency and reduce their physical footprint. For example, it was once the case that companies would need to rent large amounts of space to house data centers; cloud services reduce or eliminate the need for an enterprise to run a data center. As infrastructure and services are migrated to the cloud, those infrastructures and services are exposed to risk of security breaches.

Cloud security companies have developed tools to identify security risks for cloud infrastructure. These tools, however, are highly custom in nature, and are designed based on the particular cloud service (data provider) on which the infrastructure is installed. Thus, if an enterprise decided to house some of its infrastructure using one cloud service, and to have other parts of its infrastructure using a different cloud service, then the company would have to call on a cloud security company to provide custom solutions for each cloud service. These fragmented solutions, or policies, result in expensive and duplicative work, without an opportunity for a solution for one service to be fed into the other service. Moreover, these fragmented policies each separately provide alerts to interested parties, such as systems administrators, when security risks are identified. Thus, as infrastructure scales across many cloud services, alerts multiply as well and become overly burdensome and perhaps impossible to act on.

Additionally, fragmented security policies result in over-collection of data, which in turn may create their own security risks. For example, each policy requesting similar information to analyze similar security risks on different cloud systems results in a return of redundant information that is used to perform a risk analysis, and that redundant information is stored over a long period of time as each system analyzes the information. Thus, there is a risk that compromise of the security tool itself could result in sensitive information being obtained by a malicious actor.

SUMMARY

Systems and methods are disclosed herein for de-duplicating resource collection during policy execution. In an embodiment, a server determines that a policy is to be executed, and retrieves rules, resource identifiers, and data provider identifiers associated with the policy. The server generates a pending rules data structure and populates the pending rules data structure with identifiers of the retrieved rules and their respective necessary resources as indicated by the resource identifiers, and also generates a pending resources data structure with the resource identifiers and their respective data providers as indicated by the data provider identifiers.

The server collects, asynchronously, each resource from its associated data provider, and, as each respective resource is collected, deletes the respective resource from the pending resources data structure and populates a collected resources data structure with an identifier of the respective resource. The server determines, as each resource is collected, whether the collected resources data structure includes identifiers of all resources needed to execute a rule in the pending rules data structure, executes individual ones of the retrieved rules as it is determined that their corresponding resources have identifiers populated in the collected resources data structure, and generates one or more alerts based on results obtained from the executed rules.

BRIEF DESCRIPTION OF DRAWINGS

The disclosed embodiments have other advantages and features which will be more readily apparent from the detailed description and the accompanying figures (or drawings). A brief introduction of the figures is below.

Figure (FIG. 1 illustrates one embodiment of a system environment for implementing a data provider-agnostic cloud security tool.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium disclosed herein includes a cloud security tool that executes on policies that each may be configured to assess risk across multiple data providers. The disclosed cloud security tool helps improve on efficiency, for example, by eliminating a need for having redundant policies that are specific to each individual data provider (e.g., where multiple individual data providers together service a policy for an enterprise). Moreover, the disclosed cloud security tool improves security risk by, for example, ensuring only a minimum amount of sensitive data is retrieved, and that data is stored by the security tool for a minimal amount of time before being discarded. Other advantages of the disclosure are apparent based on the embodiments disclosed herein.

Cloud Security Tool—Exemplary Network Architecture

Figure 1:
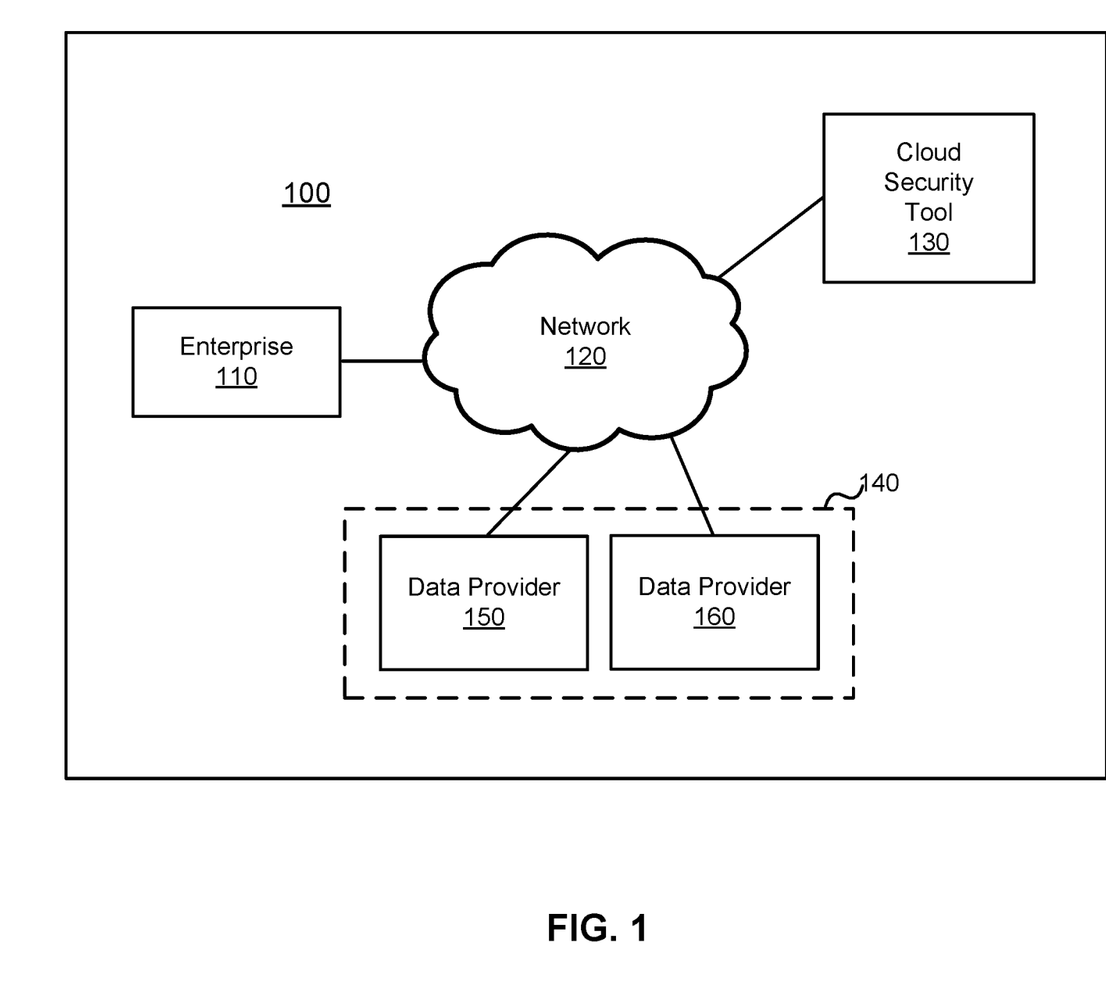

Figure (FIG. 1 illustrates one embodiment of a system environment for implementing a data provider-agnostic cloud security tool. Environment 100 includes enterprise 110, network 120, cloud security tool 130, and data providers 140, which include data provider 150 and data provider 160. Enterprise 110 may be any entity that has created infrastructure for storage on data providers 140. For example, enterprise 110 may be a business entity, such as a company, with business infrastructure stored on data providers 140. Enterprise 110 may include any, or all of, client devices, servers, and the like.

Network 120 provides a communication infrastructure between the enterprise 110, cloud security tool 130, and data providers 140. Network 120 is typically the Internet, but may be any network, including but not limited to a Local Area Network (LAN), a Metropolitan Area Network (MAN), a Wide Area Network (WAN), a mobile wired or wireless network, a private network, or a virtual private network.

Cloud security tool 130 analyzes risk in cloud-based infrastructure of enterprise 110 that is stored in data providers 140. The manner in which risk is analyzed is described in further detail with reference to FIGS. 2 and 3. Cloud security tool 130 requests data from data providers 140, receives the requested data in formats particular to each individual data provider of data providers 140, and normalizes the data for processing. Through this normalization process, cloud security tool 130 is data-provider agnostic, and is configured to interface with any data provider that uses any format for its data.

Data providers 140 include data provider 150 and data provider 160. The term data provider, as used herein, may refer to a cloud storage system that stores infrastructure for enterprise 110 (and perhaps other enterprises). Data providers also provide data (e.g., metadata that corresponds to a request) to cloud security tool 130. Data provider 150 stores data in a format different from data provider 160. Data providers 140 may include more data providers than depicted.

Cloud Security Tool—Exemplary Architecture

Figure 2:
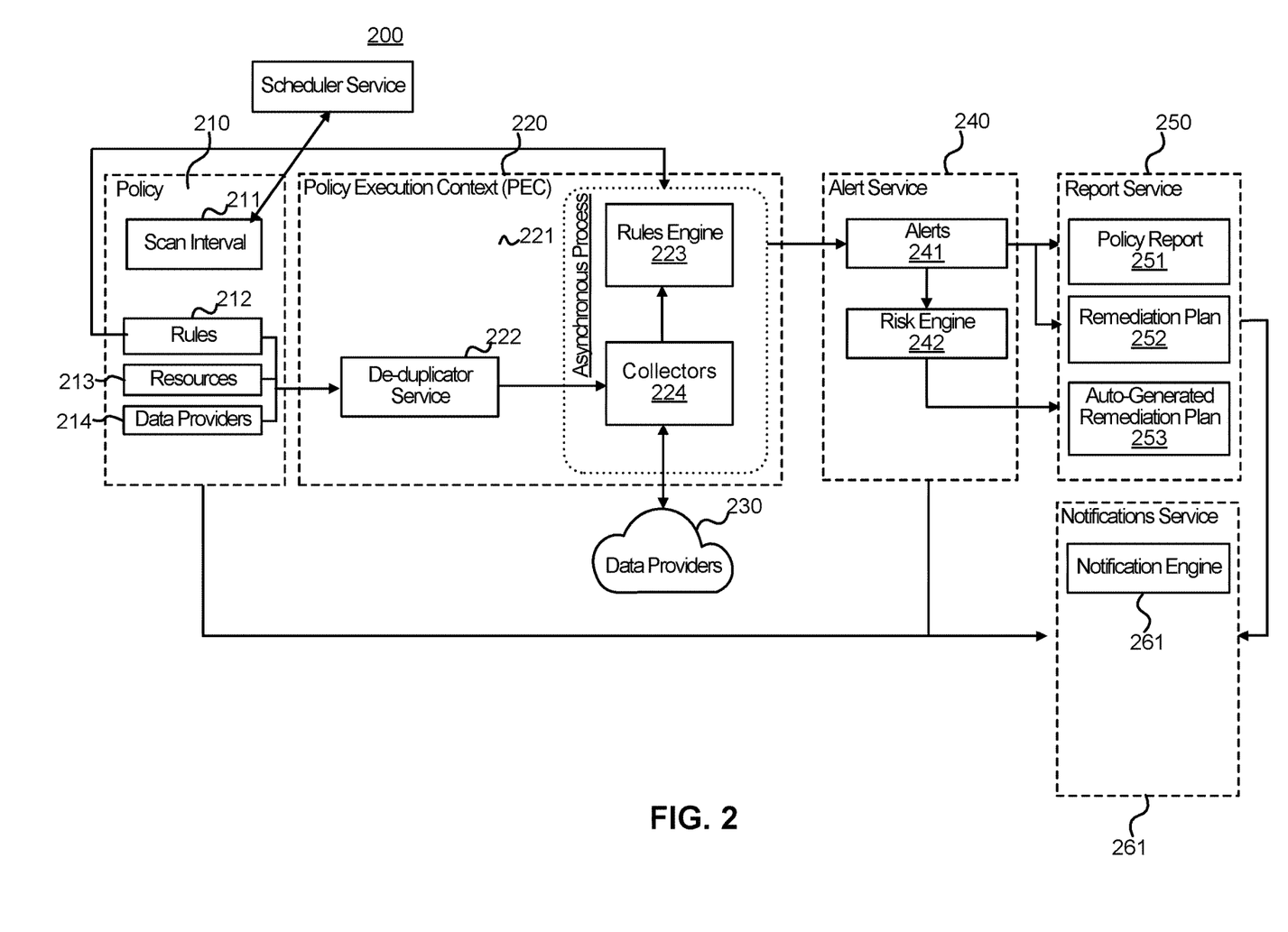
FIG. 2 illustrates one embodiment of a data provider-agnostic cloud security tool data flow.

FIG. 2 illustrates one embodiment of a data provider-agnostic cloud security tool data flow. Architecture 200 includes policy architecture 210, policy execution context (PEC) 220, data providers 230, alert service 240, report service 250, and notifications service 260. The components of architecture 200 are merely exemplary; their functionality, including the functionality of their sub-components, may be performed in any manner.

Policy architecture 210 depicts exemplary components of a given policy, which include scan interval 211, rules 212, resources 213, and data providers 214. The term policy, as used herein, may refer to a collection of one or more rules (or conditions). The term rule, as used herein, may refer to a framework to which collected data is applied. The framework may be an algorithmic process. Depending on how the data is applied to the framework, the rule may output a result. The result may be a binary flag (e.g., an interrogation has a true or false answer based on how the data fits into the framework). The result may trigger an action, which may be defined in the rule (e.g., if the interrogation has a true answer, then alert an administrator, or call an additional policy or rule). The actions that a rule may trigger may include a web-hook action, an auto-remediate action, a notify action, a generate-alert action, and a close-alert action, among others.

The result output of a rule may include any segments of the input data, either in their original state or in a transformed state. There may be 0 or more elements output. Each element denotes an individual "alert" that will be propagated through the system. As will be discussed in further detail below, when an alert occurs, and is sent from PEC 220 to the Alert Service 240, any integrations (e.g., $3^{rd}$ party integrations) that are configured for this type of alert are triggered. These integrations are generally workflow, ticketing or monitoring systems that the enterprise 110 has configured. By integrating the alerts of alert service 240 with the existing workflow of enterprise 110, the burden of adoption and onboarding effort on enterprise 110 is eased, as these alerts cross data from multiple data providers 230.

A rule may be created by a user, such as an administrator of enterprise 110 and/or cloud security tool 130. The user may add a template or test data for each data provider 230 and/or for each resource the user wants fed to the rule, and may program an output of the rule based on its outcome. Heuristics may be applied that apply the rule language to the data set to achieve the programmed output or outcome of the rule. Rules are declarative in nature, and following their being programmed, will provide an output based on the manner in which they are programmed.

A rule may have multiple associations. For example, a rule may be associated with one or more controls. A control is a detailed instruction or assertion about a specific aspect of an enterprise's infrastructure or processes that must be satisfied in order for the enterprise to meet compliance (e.g., regulatory compliance) for which the control belongs. Furthermore, a rule may belong to more than one policy at a time. As is explained with reference to FIG. 2 below, work is scheduled at a policy level, so all rules in a policy will be executed together, thus resulting in policies as a whole having a state in time. Yet further, a rule may map to more than one resource. A rule may be a grammar syntax that operates on data that is returned by one or more resources, along with a mapping to those resources. A rule may have one or more descriptive fields that may be similar to those for a policy (e.g., name, description, creation date, and so on).

A policy may be represented in a data structure including various fields. The fields may include a policy identifier (ID), a scanning interval field, and an account ID field. The policy ID enables PEC 220 to obtain the particulars of a policy, including its associated rules and resources, from a database that is indexed based on policy ID. The account ID field identifies the enterprise to which the policy corresponds (e.g., enterprise 110). The scanning interval field identifies a frequency with which a policy is to be scanned. A policy may include any number of descriptive data fields, such as a policy name, a description, a date it was created, a name of a person or entity who created the policy, whether the policy is enabled or disabled, and so on. A policy may be edited after its creation; rules may be added to a policy or removed from a policy at any time.

The term resource, as used herein, may refer to a specific unit of metadata stored by a data provider (e.g., data provider 150). Thus, as is described in the data flow below, when a policy is run, resources are retrieved from data providers and are collectively used to determine whether a rule is satisfied. In an embodiment, a user of enterprise 110 may be enabled to create a custom resource by configuring data providers and/or collectors. Resources are assigned a default risk score (e.g., ranging from 1-4, though any range or nomenclature can be applied), based on the nature of the assets that each resource represents and their potential to cause a data breach if misconfigured. A database may be included in architecture 200 that maps each resource to its default risk score. The risk score may be determined automatically (e.g., by way of a machine learning model), or may be assigned by an administrator.

PEC 220 accesses policies and executes those policies to determine whether rules are satisfied. Scheduler service 221 stores information about policies, the information including the policy ID, scanning interval, and account ID of each given policy. Schedule service 221 may be within, or outside, of PEC 220. Where outside of PEC 220, scheduler service 221 triggers activity of the PEC by communicating that it is time to execute a policy. Scheduler service determines whether a policy is to be executed by comparing the last time the policy was executed, plus the scanning interval of the policy, to a current time. Responsive to determining that the last time the policy was executed plus the scanning interval of the policy is less than or equal to the current time, scheduler service 211 triggers PEC 220 to execute the policy. Scheduler service 211 triggers this by passing along the policy ID and account ID associated with the policy to one or more processors of PEC 220. In an embodiment, PEC 220 may be triggered to execute the policy based on a non-time-based trigger (e.g., based on a predetermined event occurring, or based on some other trigger).

PEC 220, responsive to being triggered to execute a policy, accesses (e.g., downloads) information corresponding to the policy. PEC 220 may access rules 212, resources 213, and data providers 214 from the policy's policy architecture 210. Rules 212 describe the rules governing the policy corresponding to architecture 210. Resources 213 describe the resources that are to be accessed from one or more data providers to determine whether each given one of the rules 212 is satisfied. Data providers 214 describe the data providers to be queried for resources 213.

PEC 220 may validate that the policy, rule, resource, and data provider data it has received have correct relations. In order to validate the policy, PEC 220 downloads the policy, including rules, Data Provider Instances (DPIs) and resources. After the data is downloaded, PEC 220 may validate the rules against the DPIs. If a rule is included in the policy that requires data from Resource A, but there is no DPI that can gather the data from Resource A associated with the policy, then PEC 220 marks that rule as failed, and may remove the rule from the executable rule list.

In an embodiment where PEC 220 validates the policy, responsive to validating the policy, PEC 220 may proceed to a deduplication process, or may proceed to collecting resources. Where PEC 220 does not validate the policy, PEC 220 may proceed to a deduplication process, or to collecting resources, following having accessed policy architecture 210. In any case, where a deduplication process is used, de-duplicator service 222 may generate a data structure for pending rules, and another data structure for pending resources. The pending rules data structure may include the received rule data (that is, rules 212 for the given policy), and the pending resources data structure may include the resources that have yet to be collected (that is, yet-to-be-collected ones of resources 213 for the given policy).

The data structures may be tables. The separate data tables (or other data structures) exist because they each represent independent but interrelated tasks in the execution process. As depicted below, an exemplary pending resources data structure represented as a table is called Table A, and it is used to track the Resources for the policy for which PEC 220 is still waiting to return data. As is also depicted below, an exemplary pending rules data structure is represented as a table called Table B, which houses the pending rules. Table B is dependent on the Resource data listed in Table A being available in order to execute the rules.

TABLE A

| Pending Data Providers | Pending Resources |
|---|---|
| Data Provider #1 | Resource A |
| Data Provider #2 | Resource B |
| Data Provider #3 | Resource C |

TABLE B

| Pending Rules | Required Resources |
|---|---|
| Rule #1 | Resource A, Resource B |
| Rule #2 | Resource B, Resource C |

As is described below with reference to functionality of collectors 224, collectors 224 are instantiated for each of data providers 230 indicated by the pending data providers data structure, and collect resources asynchronously, e.g., as fast as possible. These operations return at different times. Each time data for a Resource is successfully collected, the resource is removed from the pending resources data structure (table A) and moved to another data structure (such as a collected resources table) for tracking. The Pending Rules data structure (table B) is then inspected to see if the newly collected data for the Resource can be combined in some combination with all of the previously collected Resource data to execute any pending rules. This process continues until there are no more Pending Resources. In this manner, de-duplicator service 222 consolidates the pending resources data structure, concatenates the data therein, and transforms the data into a resource set. The reason why deduplication occurs through this process is as follows. A policy can have multiple rules which require data from a particular resource (Resource A). A policy can have multiple DPIs that can provide Resource A (e.g. two separate accounts on one data provider, or accounts scattered across multiple data providers). This relationship between the Policy, DPIs, Resources and Rules creates a matrix (e.g., like a cartesian product). The de-duplication performed by de-duplicator service 222 ensures that the cells in the matrix are each unique. This ensures that Resource data is only collected from a DPI once and then applied to a Rule only when new Resource data is ready.

Collectors 224 include a plurality of collectors, each of which is configured to retrieve data from one or more of data providers 230. The description of data providers 140 equally applies to data providers 230. Data providers 230 may convey specific details about how given collectors of collectors 224 for a given resource should operate. For example, data providers 230 may have details regarding authentication that a collector may need to provide a given data provider in order to retrieve requested metadata. A user (e.g., of enterprise 110) may configure data providers 230 as top-level objects in their account. Each of data providers 230 may have a unique name. Data providers 230 may have different data depending on their type. After configuration, data providers 230 are saved in an account of enterprise 110 and may be used for as many resources as necessary. In an embodiment, each resource has a single data provider of data providers 230.

Each collector is configured to, based on input (e.g., a given resource from the pending resource data structure), identify which of data providers 230 has the resource, and to request the resource from that data provider. In an embodiment, collectors 224 are instantiated on an as-needed basis. That is, PEC 220 determines which collectors are to be used based on the resources included in the pending resource data structure, and instantiates those collectors as collectors 224. Collectors 224 retrieve metadata corresponding to the resources of the pending resource data structure from the indicated ones of data providers 230.

In an embodiment, collectors 224 transmit the retrieved metadata to rules engine 223 for processing. In an embodiment, prior to transmitting the retrieved metadata to rules engine 223, collectors 224 normalize the retrieved metadata to a uniform format. The normalization that occurs depends on the Resource data type. Rules engine 223 works against a predefined type of data (e.g., JSON data). Taking JSON as an example, if the Resource data is in a different format, such as YAML, HOCON, CSV, etc. it is converted to JSON. Also, depending on the Resource type, the JSON structure may be flattened or split up into several JSON documents (in the case of large lists of structures). As an example, rules engine 223 may operate using a JSON format; the normalization process executed by collectors 224 may convert the retrieved metadata from its original format to the JSON format used by rules engine 223. Normalization may include a full data type changes, such as transforming 4ML data to JSON format, YAML format to JSON format, and so on. The normalization process results in a data provider-agnostic rules engine, thus enabling individual policies to operate across multiple ones of data providers 230. Regardless of whether the rule data is normalized, collectors 224 may transmit the retrieved metadata to rules engine 223 asynchronously, meaning that rules engine 223 may process some retrieved metadata while other metadata is in the process of being retrieved, thus resulting in more efficient processing due to collectors 224 and rules engine 223 acting in parallel.

Rules engine 223 evaluates the provided resource data against the rule logic (e.g., the above described framework) associated with each given rule in the pending rules table. Where the metadata satisfies the rule logic, rules engine 223 may determine that there is no security risk, or may perform some other action. Where the metadata fails the rule logic, rules engine 223 may determine that the rule is failed, and may annotate the pending rules data structure (or another data structure) to indicate that the rule is failed. Rules engine 223 may transmit an indication that a rule is failed to alert service 240.

Alert service 240 includes alerts module 241 and risk engine 242. Alerts module 241 generates alerts for failed rules. The term alert, as used herein, may refer to a collection of information about a rule failure. The alert may include information pertaining to a time a failure is recorded, an identity of the failing resources, and an indication of the particular rule that was failed. Alert service 240 may use alerts to produce various resulting information, such as security and compliance statistics, a security infrastructure risk score (SIR score), and an auto-generated remediation plan, each of which will be described in further detail with respect to FIG. 3 below.

Alert service 240 transmits data to report service 250. Report service 250 may output reports, including policy report 251, remediation plan 252, and auto-generated remediation plan 253, to an interested individual, such as an administrator of enterprise 110, an administrator of cloud security tool 130, or another party. Policy report 251 may indicate which policies did, or did not, include rules that were not satisfied, and may indicate security risks posed by failure of a given rule. Remediation plan 252 may indicate action that should be taken to close or minimize the security risk and/or cause the rule to be satisfied in the future. Auto-generated remediation plan 253 may be output by risk engine 242. These reports may include a policy execution instance that may have fields such as an execution start time, an execution finish time, a trigger, and an execution instance ID. This information is useful in that all rules within a policy are executed together, and thus enterprises and other interested parties (e.g., auditors) may use the reports to know its in its latest state at the time of inspection. Generated reports may be point-in-time snapshots of the state of enterprise 110 (or any given enterprise) as it pertains to the policies that were executed against the infrastructure of enterprise 110. The reports may include metrics detailing the statistics gathered from executing the policy against the infrastructure, such as a number of alerts generated, a number of rules passed or failed, a count of resources inspected, and so on. In an embodiment, data acquired by collectors 224 that is used to generate a policy execution instance is discarded at an earliest time possible (e.g., upon a policy execution instance being finalized).

Notifications service 260 includes notifications engine 261. Notifications engine 261 transmits reports generated by reports service 250 to an interested party. Various services, such as SMTP and HTTP, may be used to transmit the reports.

Exemplary Alert Service and Risk Engine Data Flow

Figure 3:
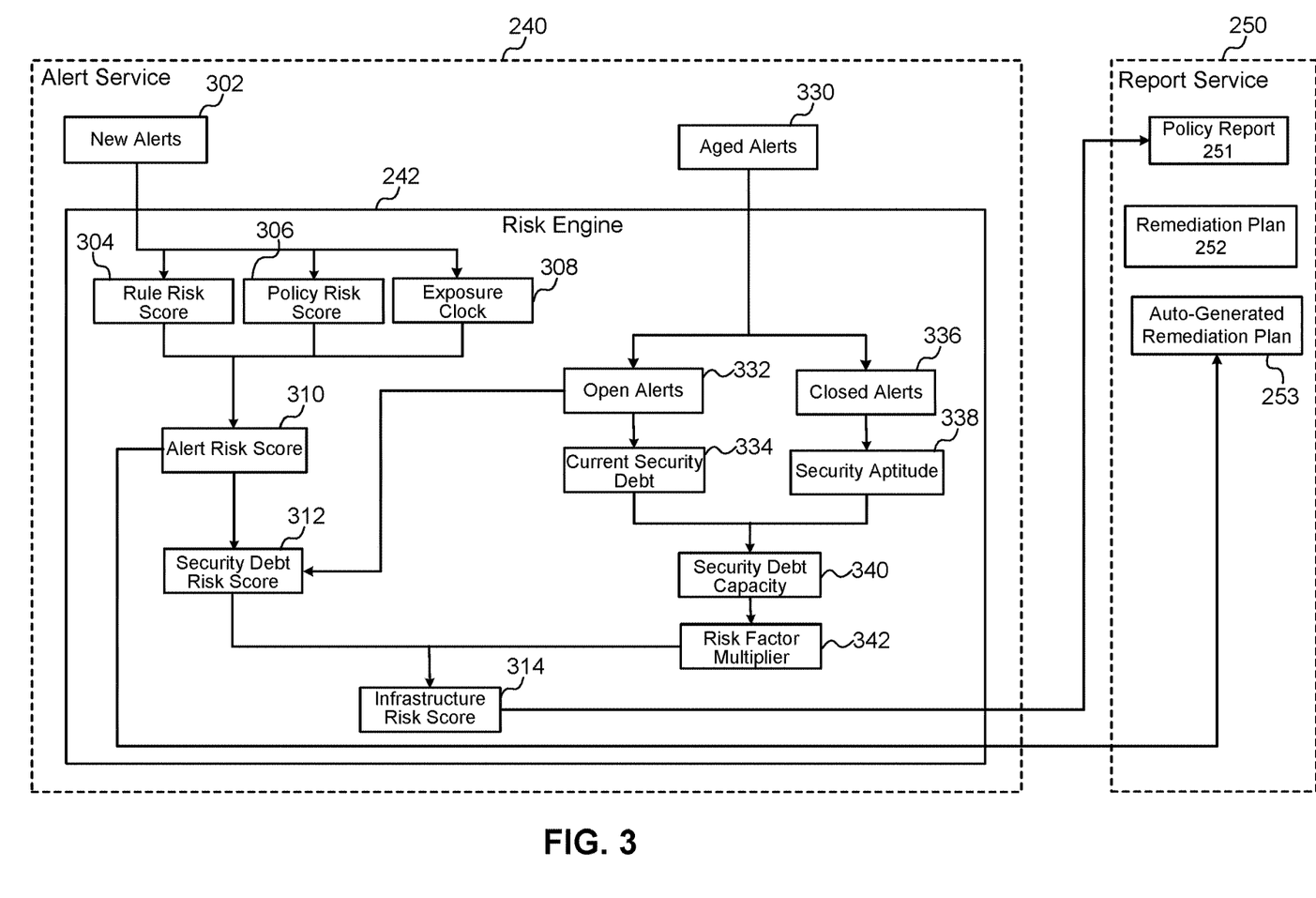
FIG. 3 illustrates one embodiment of a detailed data flow for an alert service that includes a risk engine.

FIG. 3 illustrates one embodiment of a detailed data flow for an alert service that includes a risk engine. Alert service 240 generates new alerts 302 as rules are determined to have failed, as described above with reference to FIG. 2. Risk engine 242 assigns each new alert risk score and an exposure clock. The risk score may be applied at multiple levels. At the lowest level is a risk score for the rule itself. At a next level is a risk score for a policy, which is an accumulation of the risk scores for each rule in the policy. Resources are applied to each rule and are orthogonal to the application of risk score. The creator of a rule may assign a risk multiplier during rule creation that is used if any given resource causes the rule to fail. Rule risk score module 304 assigns a risk score to the alert based on one or more resources that caused the rule to fail, using any risk multiplier that is assigned to those one or more resources. Policy risk score module 306 determines the risk score for the policy based on an aggregation of the risk scores assigned to each rule of the policy. Rule risk score module 306 receives the determined risk score from resource risk score module 304 and applies the received risk score to the rule.

Exposure clock module 308 triggers a running clock for the alert that determines, using any unit of time (e.g., seconds, minutes, hours, days, etc.), an amount of time from the generation of the alert until a present time. The exposure clock for each given alert runs until remediation is performed that mitigates or eliminates the risk.

Alert risk score module 310 adjusts the risk score assigned to the alert by rule risk score module 306 based on the value of exposure clock 308. That is, the risk score is weighted based on the value of the exposure clock of the alert. This is because the longer an outstanding alert remains without remediation, the larger the risk to the enterprise. When a resource is exposed due to a rule violation for longer periods of time, malicious actors have more opportunity to compromise that resource. Accordingly, the risk score increases as the exposure clock runs. Other factors may cause the risk score to be weighted. Alert risk score module 310 may iteratively update the risk score for each given alert as their exposure clocks run. Risk engine 242 may transmit the risk score, including updated versions thereof, to auto-generated remediation plan module 253, which may update the remediation plan accordingly.

In an embodiment, security debt risk score module 312 determines a security debt risk score for a given enterprise. To determine the security debt risk score, security debt risk score module 312 first determines a security aptitude of the enterprise. The term security debt aptitude, as used herein, may refer to a projected number of alerts the enterprise can remediate in a given period of time (e.g., one day). Security debt risk score module 312 determines the security aptitude of a given enterprise by identifying, in a certain set of time relative to a current time (e.g., the past thirty days), a predetermined number of sub-sets of time (e.g., five of the last thirty days) where the highest number of alerts were remediated. For example, the top five days with the most alerts remediated out of the last thirty days are identified. The security aptitude is determined by performing a statistical operation (e.g., averaging) the number of alerts remediated in each of those sub-sets of time. Security debt risk score module 312 then calculates the security debt by determining the number of alerts currently outstanding by the security aptitude of the enterprise.

As is implied based on the way it is calculated, the term security debt may refer to an amount of alerts that is higher than a typical amount of alerts that can be remediated in a given period of time (e.g., in a day). The term security debt risk refers to an amount of risk that a current security debt imposes. Security debt risk score module 312 may calculate the security debt risk by performing a statistical aggregation of (e.g., adding) (1) the risk score for each rule that is failed, the (2) the risk score of each resource that failed the each such rule, and (3) the risk score derived from the exposure time, and then dividing the result of the statistical aggregation (e.g., the sum) by the maximum potential score the infrastructure could achieve, if all rules were being violated by all relevant resources.

In parallel with processing new alerts, aged alerts 330 are also processed. Aged alerts 330 include alerts with an exposure clock indicating at least a threshold amount of time has passed (e.g., a non-zero exposure clock). Open alerts module 332 continually updates risk scores for those alerts based on their exposure clocks, as discussed above, which feeds back into security debt risk score module 312 to update calculations. Closed alerts module 336 determines when alerts are remediated, and converts their status from open to closed. Security aptitude module 338 updates the security aptitude calculation described above when alerts are closed. Security debt capacity module 340 updates the security debt calculation (described above) as alerts are closed.

Risk factor multiplier module 342 determines a multiplier to apply to the security debt risk score based on the security debt relative to the security debt capacity. The security debt capacity acts as a bench mark, so if the security debt is equal to the security debt capacity, then the multiplier is 1×. Risk factor multiplier module 342 determines the multiplier based on security debt relative to capacity, so a higher multiplier is assigned proportionally to how much the security debt exceeds the security debt capacity, and a lower multiplier is assigned proportionally to how much the security debt is below the security debt capacity. Infrastructure risk score module 314 determines the risk score for the infrastructure by multiplying the security debt risk score by the risk factor multiplier. Risk engine 242 transmits the infrastructure risk score to report service 250 for generating the auto-generated remediation plan 253.

Auto-generated remediation plan 253 may prioritize alerts based on various parameters. Alert age may be used, where alerts are prioritized based on their age (e.g., oldest alerts show up higher in the plan). Risk score may be used, where alerts with higher risk scores are prioritized. A "Time to Remediate" (TTR) parameter may be calculated for a given type of alert, where the TTR corresponds to a statistical aggregate (e.g., average) of time for a type of alert that is open for enterprise 110. Alerts with higher or lower TTRs may be prioritized. Impact may be used to prioritize—that is, alerts that, when addressed, result in resolving a higher number of problems relative to other alerts may be prioritized. Alert severity—that is, a level of severity of the alert that may be determined from a mapping database, may be used to prioritize alerts. These factors may also factor into the risk score calculation as described above.

Computing Machine Architecture

Figure 4:
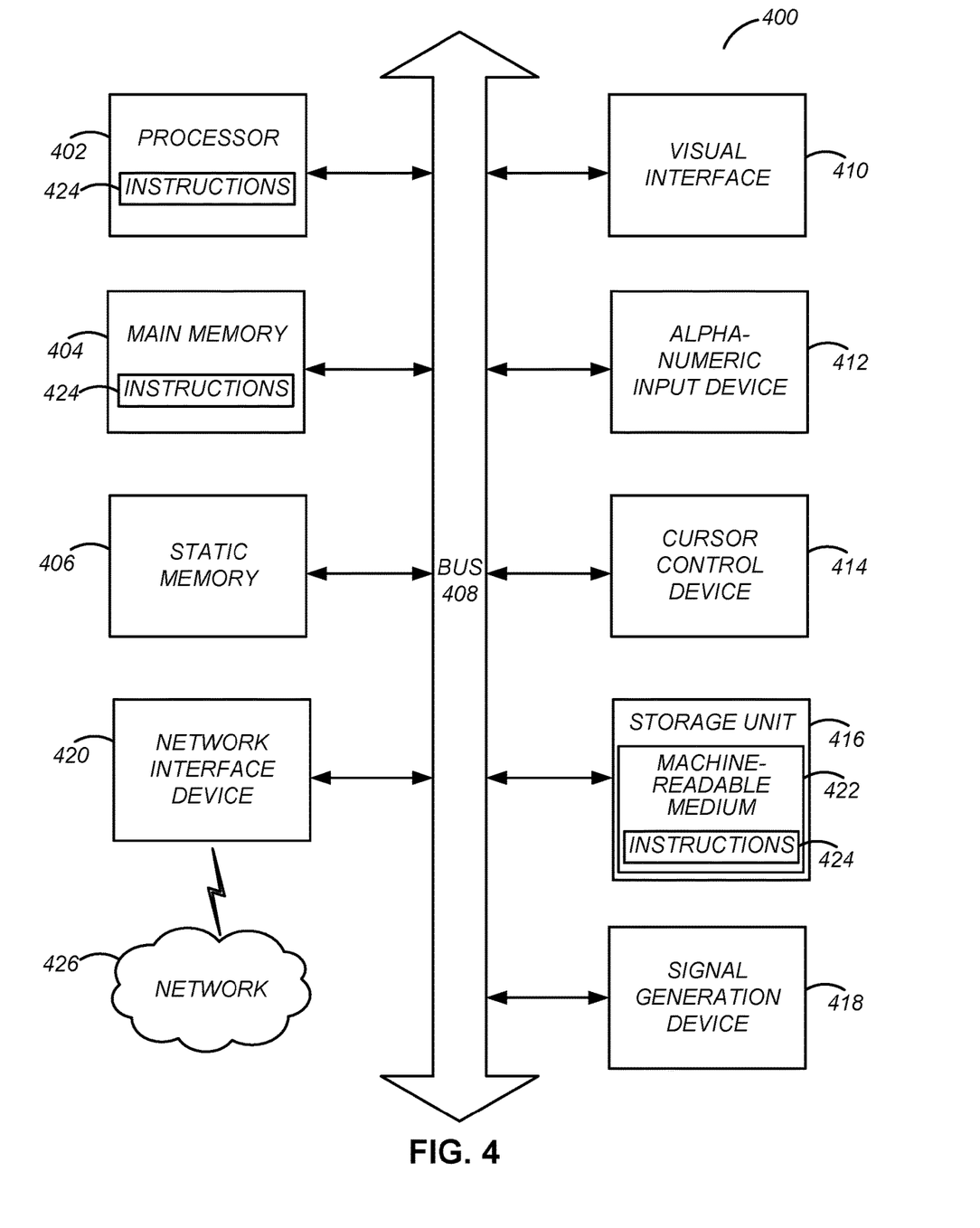
FIG. 4 is a block diagram illustrating components of an example machine able to read instructions from a machine-readable medium and execute them in a processor (or controller) of an enterprise and/or cloud security tool.

FIG. 4 is a block diagram illustrating components of an example machine (e.g., as used by enterprise 110 and/or cloud security tool 130) able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Data Flows for Enterprise Risk Levels and De-Duplication

Figure 5:
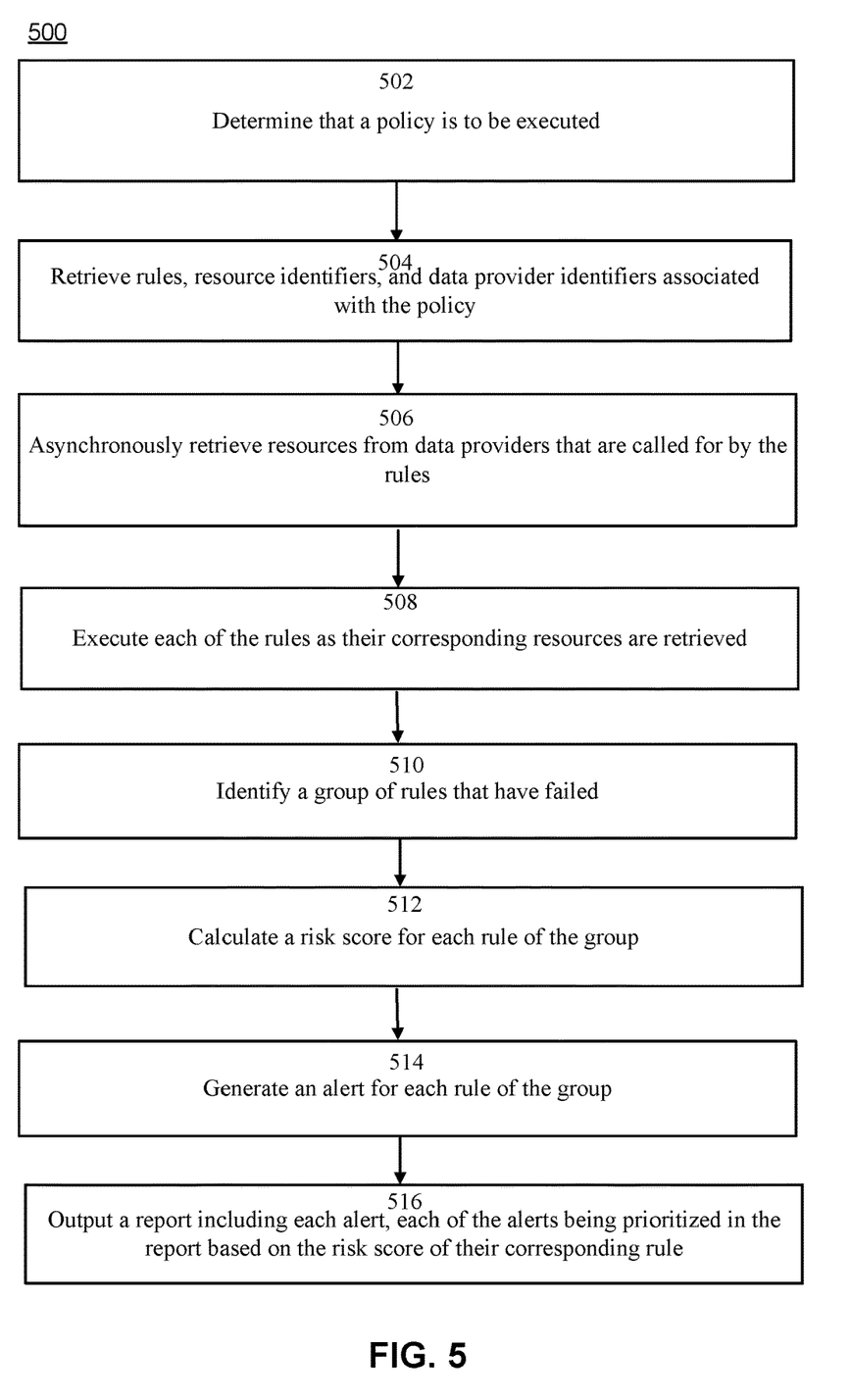
FIG. 5 depicts an exemplary data flow for determining a risk level within an enterprise cloud computing environment, in accordance with an embodiment.

FIG. 5 depicts an exemplary data flow for determining a risk level within an enterprise cloud computing environment, in accordance with an embodiment. Process 500 begins with one or more processors (e.g., processor 402) installed on one or more servers or devices running architecture 200 determining 502 that a policy is to be executed (e.g., policy 210, based on scan interval 211, using a scheduler service). The one or more processors retrieve 504 rules (e.g., rules 212), resource identifiers (e.g., resources 213), and data provider identifiers (e.g., data providers 214) associated with the policy.

The one or more processors asynchronously retrieve 506 resources from data providers (e.g., data providers 230) that are called for by the rules (e.g., using collectors 224), execute 508 each of the rules as their corresponding resources are retrieved (e.g., using rules engine 223). The one or more processors identify 510 a group of rules that have failed (e.g., using rules engine 223), and calculate 512 a risk score for each rule of the group (e.g., using alert service 240). The one or more processors generate 514 an alert for each rule of the group (e.g., using alerts 241), and output 516 a report including each alert, each of the alerts being prioritized in the report based on the risk score of their corresponding rule (e.g., using report service 250).

Figure 6:
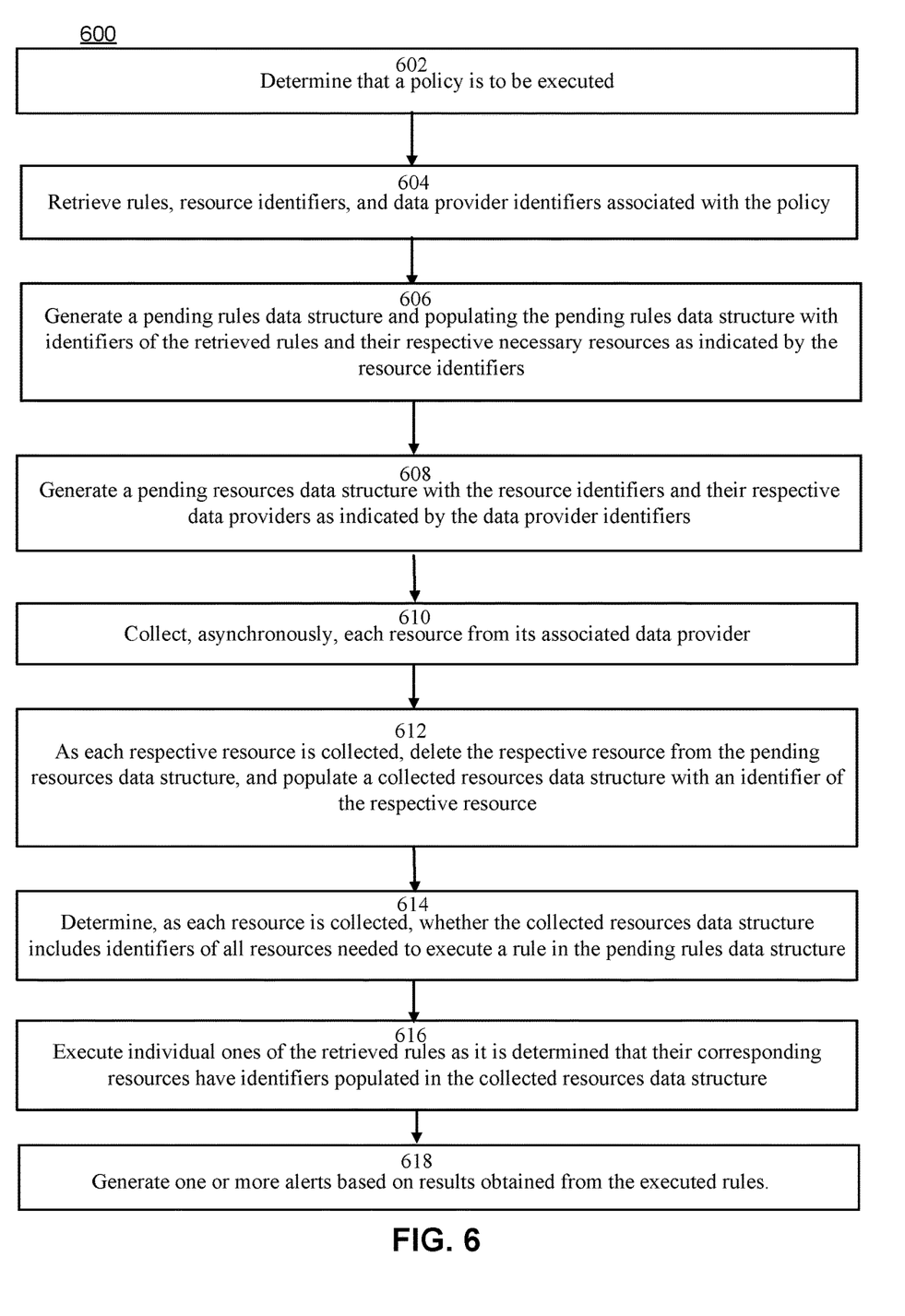
FIG. 6 depicts an exemplary data flow for de-duplicating resource collection during policy execution, in accordance with an embodiment.

FIG. 6 depicts an exemplary data flow for de-duplicating resource collection during policy execution, in accordance with an embodiment. Process 500 begins with one or more processors (e.g., processor 402) installed on one or more servers or devices running architecture 200 determining 602 that a policy is to be executed (e.g., policy 210, as determined using scan interval 211). The one or more processors retrieve 604 rules (e.g., rules 212), resource identifiers (e.g., resources 213), and data provider identifiers (e.g., data providers 214) associated with the policy.

The one or more processors generate 606 a pending rules data structure and populate the pending rules data structure with identifiers of the retrieved rules and their respective necessary resources as indicated by the resource identifiers, and also generate 608 a pending resources data structure with the resource identifiers and their respective data providers as indicated by the data provider identifiers (e.g., using rules engine 223). The one or more processors collect 610, asynchronously, each resource from its associated data provider (e.g., using collectors 224).

As each respective resource is collected, the one or more processors delete 612 the respective resource from the pending resources data structure, and populate a collected resources data structure with an identifier of the respective resource (e.g., using rules engine 223). The one or more processors determine 614, as each resource is collected, whether the collected resources data structure includes identifiers of all resources needed to execute a rule in the pending rules data structure (e.g., using rules engine 223). The one or more processors execute 616 individual ones of the retrieved rules as it is determined that their corresponding resources have identifiers populated in the collected resources data structure, and generate 618 one or more alerts based on results obtained from the executed rules (e.g., using alert service 240).

Additional Configuration Considerations

The disclosed cloud security tool improves on efficiency by eliminating a need for having redundant policies that are specific to each individual data provider. Moreover, the disclosed cloud security tool improves security risk by ensuring only a minimum amount of sensitive data is retrieved, and that data is stored by the security tool for a minimal amount of time before being discarded. Other advantages of the disclosure are apparent based on the embodiments disclosed herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for implementing a cloud security tool through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope disclosed.

What is claimed is:

1. A non-transitory computer-readable medium comprising stored instructions executable by at least one processor, the instructions when executed causing the at least one processor to:
    retrieve rules, resource identifiers, and data provider identifiers associated with a policy;
    generate a pending rules data structure and populating the pending rules data structure with identifiers of the retrieved rules and their respective necessary resources as indicated by the resource identifiers, the pending rules data structure indicating a set of the rules that has not yet been executed;
    generate a pending resources data structure with the resource identifiers and their respective data providers as indicated by the data provider identifiers, the pending resources data structure indicating a set of the resource identifiers corresponding to unretrieved resources that are to be retrieved in order to execute one or more of the rules;
    collect, asynchronously, each resource from its associated data provider;
    as each respective resource is collected, populate a collected resources data structure with an identifier of the respective resource;
    execute individual ones of the retrieved rules as it is determined that their corresponding resources have identifiers populated in the collected resources data structure; and
    generate one or more alerts based on results obtained from the executed rules.

2. The non-transitory computer-readable medium of claim 1, wherein the instructions further comprise instructions to:
    access a last time the policy was executed;
    generate a run time for the policy by adding a scanning interval to the last time the policy was executed;
    determine whether the run time is less than or equal to a current time; and
    responsive to determining that the run time is less than or equal to the current time, determine that resource collection for the policy is to occur.

3. The non-transitory computer-readable medium of claim 1, wherein the pending rules data structure indicates rules that have not yet been executed, and wherein rules indicated by the pending rules data structure are deleted from the pending rules data structure as they are executed.

4. The non-transitory computer-readable medium of claim 1, wherein the pending resources data structure indicates a given resource identifier corresponding to a given resource provided by two or more data providers, and wherein the given resource identifier is deleted from the pending resources data structure responsive to the given resource having been retrieved by one of the two or more data providers.

5. The non-transitory computer-readable medium of claim 1, wherein the at least one processor is further caused to normalize metadata of each respective resource to a uniform format.

6. The non-transitory computer-readable medium of claim 1, wherein the instructions to execute individual ones of the retrieved rules when executed cause the one or more processors to evaluate corresponding resources for a given rule against logic of the given rule.

7. The non-transitory computer-readable medium of claim 6, wherein the instructions to generate one or more alerts based on results obtained from the executed rules when executed cause the at least one processor to:
    determine that metadata of the corresponding resources fails the logic of the given rule; and
    generate an alert for the given rule responsive to determining that the metadata of the corresponding resources fails the logic of the given rule.

8. A method comprising:
    retrieving rules, resource identifiers, and data provider identifiers associated with a policy;
    generating a pending rules data structure and populating the pending rules data structure with identifiers of the retrieved rules and their respective necessary resources as indicated by the resource identifiers, the pending rules data structure indicating a set of the rules that has not yet been executed;
    generating a pending resources data structure with the resource identifiers and their respective data providers as indicated by the data provider identifiers, the pending resources data structure indicating a set of the resource identifiers corresponding to unretrieved resources that are to be retrieved in order to execute one or more of the rules;

collecting, asynchronously, each resource from its associated data provider;

as each respective resource is collected, populating a collected resources data structure with an identifier of the respective resource;

executing individual ones of the retrieved rules as it is determined that their corresponding resources have identifiers populated in the collected resources data structure; and generating one or more alerts based on results obtained from the executed rules.

9. The method of claim 8, further comprising:

accessing a last time the policy was executed;

generating a run time for the policy by adding a scanning interval to the last time the policy was executed;

determining whether the run time is less than or equal to a current time; and responsive to determining that the run time is less than or equal to the current time, determining that resource collection for the policy is to occur.

10. The method of claim 8, wherein the pending rules data structure indicates rules that have not yet been executed, and wherein rules indicated by the pending rules data structure are deleted from the pending rules data structure as they are executed.

11. The method of claim 8, wherein the pending resources data structure indicates a given resource identifier corresponding to a given resource provided by two or more data providers, and wherein the given resource identifier is deleted from the pending resources data structure responsive to the given resource having been retrieved by one of the two or more data providers.

12. The method of claim 8, further comprising normalizing metadata of each respective resource to a uniform format.

13. The method of claim 8, wherein executing individual ones of the retrieved rules comprising evaluating corresponding resources for a given rule against logic of the given rule.

14. The method of claim 13, wherein generating one or more alerts based on results obtained from the executed rules comprises:

determining that metadata of the corresponding resources fails the logic of the given rule; and generating an alert for the given rule responsive to determining that the metadata of the corresponding resources fails the logic of the given rule.

15. A system comprising:

memory with instructions encoded thereon; and one or more processors that, when executing the instructions, are caused to perform operations comprising:

retrieving rules, resource identifiers, and data provider identifiers associated with a policy;

generating a pending rules data structure and populating the pending rules data structure with identifiers of the retrieved rules and their respective necessary resources as indicated by the resource identifiers, the pending rules data structure indicating a set of the rules that has not yet been executed;

generating a pending resources data structure with the resource identifiers and their respective data providers as indicated by the data provider identifiers, the pending resources data structure indicating a set of the resource identifiers corresponding to unretrieved resources that are to be retrieved in order to execute one or more of the rules;

collecting, asynchronously, each resource from its associated data provider;

as each respective resource is collected, populating a collected resources data structure with an identifier of the respective resource;

executing individual ones of the retrieved rules as it is determined that their corresponding resources have identifiers populated in the collected resources data structure; and generating one or more alerts based on results obtained from the executed rules.

16. The system of claim 15, the operations further comprising:

accessing a last time the policy was executed;

generating a run time for the policy by adding a scanning interval to the last time the policy was executed;

determining whether the run time is less than or equal to a current time; and responsive to determining that the run time is less than or equal to the current time, determining that resource collection for the policy is to occur.

17. The system of claim 15, wherein the pending rules data structure indicates rules that have not yet been executed, and wherein rules indicated by the pending rules data structure are deleted from the pending rules data structure as they are executed.

18. The system of claim 15, wherein the pending resources data structure indicates a given resource identifier corresponding to a given resource provided by two or more data providers, and wherein the given resource identifier is deleted from the pending resources data structure responsive to the given resource having been retrieved by one of the two or more data providers.

19. The system of claim 15, the operations further comprising normalizing metadata of each respective resource to a uniform format.

20. The system of claim 15, wherein executing individual ones of the retrieved rules comprising evaluating corresponding resources for a given rule against logic of the given rule.

* * * * *